Aug. 5, 1958 R. N. PHELPS 2,845,966
LATHE ACCESSORY
Filed April 12, 1957
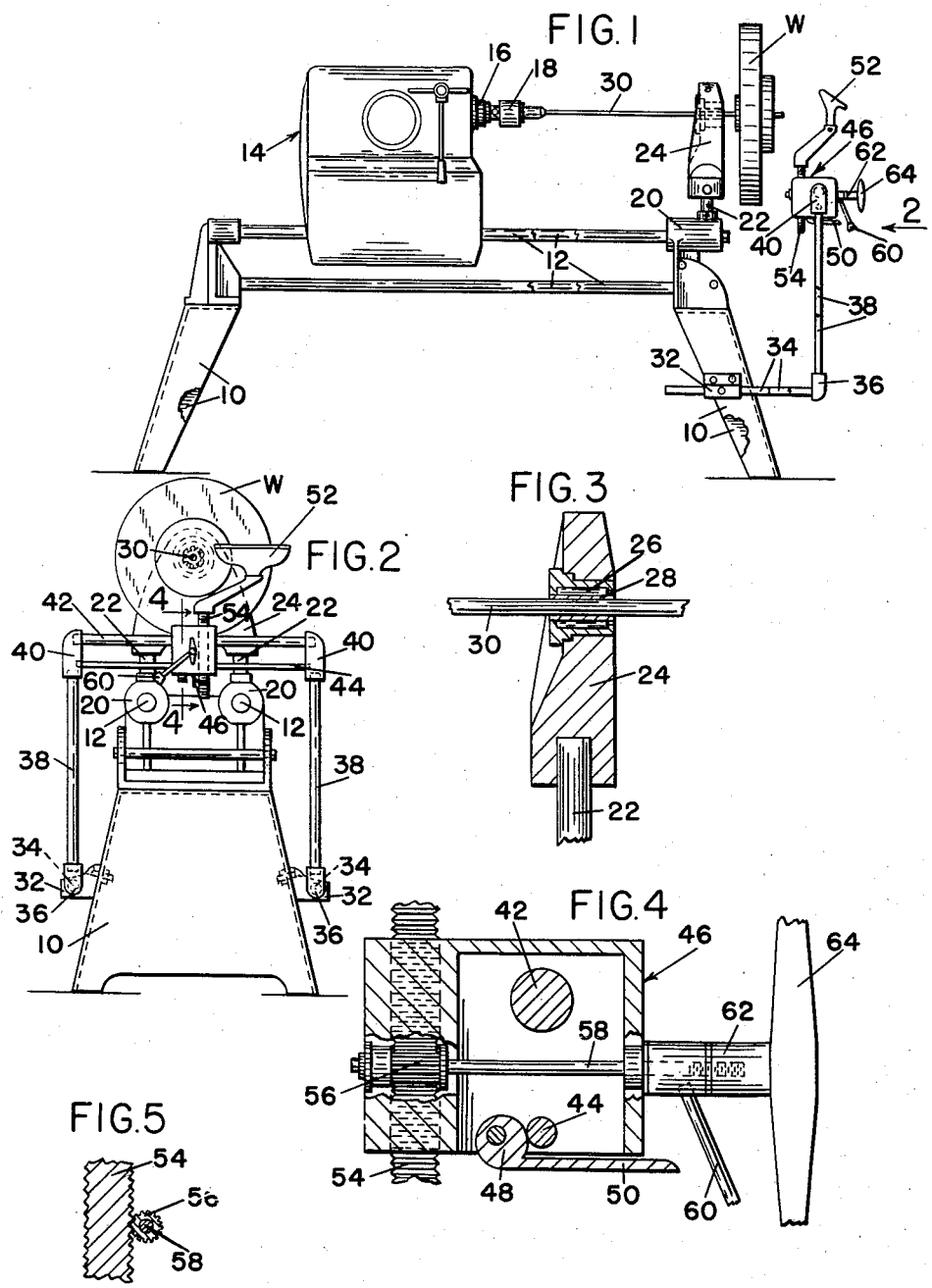
INVENTOR.
ROBERT N. PHELPS
BY *Charles R. Fay*
ATTORNEY United States Patent Office 2,845,966
Patented Aug. 5, 1958

2,845,966

LATHE ACCESSORY

Robert N. Phelps, Ashburnham, Mass.

Application April 12, 1957, Serial No. 652,542

3 Claims. (Cl. 142—48)

This invention relates to an accessory for a lathe and is particularly adapted to the outboard lathe operation by which no limit is placed on the diameter of the work being turned, by obstruction mechanism of the lathe itself such as the ways.

It is the principal object of the present invention to provide an accessory or extension for the headstock of the lathe, in combination with the tailstock, the latter being as a supporting bearing or journal for the extension, the latter being in the form of a shaft which extends through the tailstock and is driven by means of the headstock in the usual manner of the work, whereby a piece of work may be applied to said shaft at the opposite side of the tailstock from the headstock; and the provision of an accessory as above described including the provision of a special new and improved tool rest and support therefor.

Other objects and advantages of the invention will appear hereinafter.

Reference is to be had to the accompanying drawings, in which

Fig. 1 is a view in side elevation illustrating the invention;

Fig. 2 is an end view thereof, looking in the direction of arrow 2 in Fig. 1;

Fig. 3 is an enlarged section through the novel shaft supporting tailstock device;

Fig. 4 is an enlarged section on line 4—4 of Fig. 2; and

Fig. 5 is a detail illustrating the means for elevating the tool rest.

In carrying out the present invention, the same is shown as applied to a commercial wood-working lathe. This lathe is provided with a machine frame including legs 10. These legs support a horizontal frame 12 which may be of any particular form or shape desired or convenient and supports a headstock generally indicated at 14. This headstock may include a motor (not shown) but in any event it must contain power transmission means for rotating the driver 16 in this case preferably including a chuck of usual design as at 18.

At one end of the frame, there is provided a pair of horizontal spaced hollow cylinders or bosses 20 which are utilized to receive the bars 12 making up the frame of the machine. These bosses also provide vertical reception for a pair of legs 22 supporting the tailstock 24. This tailstock may be of any usual or conventional design except that in this invention it is provided with a roller 26 and preferably with a bronze bushing or the like 28 for the reception of a shaft 30 comprising a part of the invention. This shaft is inserted and held in the chuck 18 to be rotated thereby and journaled in the brushing and roller bearings 26.

Shaft 30 extends completely through the tailstock as clearly shown in Fig. 1, and any desired means is associated with the free end of shaft 30 by which a piece of work W may be mounted to be turned down outboard of the tailstock, i. e. at the opposite side thereof from the headstock. The work W has no limitation as to diameter, whereas if mounted between the head and the tailstock it is limited in the swing by the frame members 12.

Mounted on one end of the machine as by one of the legs 10, there are an additional pair of bosses 32 for longitudinally adjustably receiving rods or pipes 34. On these rods or pipes, there are mounted brackets 36 and uprights 38.

Uprights 38 mount at their upper ends brackets 40 which between them mount a horizontal pipe or the like 42 and a carriage stabilizing rod 44 in vertically spaced relation thereto as clearly shown in Figs. 2 and 4.

The rods 42 and 44 slidably mount thereon a tool rest carriage generally indicated at 46 which is slidable transversely of the machine as shown in Fig. 2. A cam clamp 48 may be utilized to clamp carriage 46 to the rods and the cam clamp 48 may be provided with a handle 50 extending past an edge of the carriage for easy manipulation thereof.

Carriage 46 mounts a vertically adjustable tool rest 52 which is raised up and down on a rack or threaded member 54 by means of a pinion 56 rotated by a rod 58 having attached thereto a crank handle 60. A lock nut or the like 62 having a handle 64 may be employed to maintain the tool rest in its adjusted position vertically.

Having thus described my invention and the advantages thereof, I do not wish to be limited to the details herein disclosed, otherwise than as set forth in the claims, but what I claim is:

1. An accessory extension construction for a lathe having a frame including a ways, comprising a chuck adapted to be driven by the headstock of the lathe, a shaft, said shaft being driven by the chuck, a tailstock member on the frame, a rotary bearing in the tailstock member axially aligned with the chuck, said shaft passing through the bearing and being journalled therein and extending beyond the tailstock member oppositely to the headstock.

2. An accessory extension construction for a lathe having a frame including a ways and a headstock and tailstock member, said construction comprising means adapted to be rotated by the headstock of the lathe, a shaft, said shaft being driven by said means, said tailstock member being on the frame, a rotary roller bearing in the tailstock member, said shaft passing through the bearing and being journalled therein and extending beyond the tailstock member oppositely to the headstock, said shaft being adapted to rotatably mount a workpiece for outboard turning thereof.

3. An accessory extension construction for a lathe having a frame including a ways, comprising a chuck adapted to be driven by the headstock of the lathe, a shaft, said shaft being driven by the chuck, a tailstock member on the frame, a rotary bearing in the tailstock member axially aligned with the chuck, said shaft passing through the bearing and being journalled therein and extending beyond the tailstock member oppositely to the headstock, spaced horizontal bosses on the frame parallel to the shaft, rods in the bosses for longitudinal adjustment, a frame on the rods including a track, said track being transverse of the axis of the lathe and outboard of the tailstock member, a carriage on the track, a vertically adjustable tool rest on the carriage, and means to lock the carriage in adjusted position on the track to position the tool rest in desired relation to the work.

References Cited in the file of this patent

UNITED STATES PATENTS

| 1,876,992 | MacLeod | Sept. 13, 1932 |
| 2,697,456 | Goldschmidt | Dec. 21, 1954 |
| 2,780,125 | Milyard | Feb. 5, 1957 |